March 13, 1934.    J. W. BRYCE    1,950,475
TABULATING MACHINE
Filed July 1, 1926    10 Sheets-Sheet 1

Inventor
J. W. Bryce
By his Attorneys
Cooper, Kerr & Dunham

March 13, 1934.  J. W. BRYCE  1,950,475
TABULATING MACHINE
Filed July 1, 1926    10 Sheets-Sheet 2

Inventor
J. W. Bryce
By his Attorneys
Cooper, Kerr & Dunham

March 13, 1934.     J. W. BRYCE     1,950,475
TABULATING MACHINE
Filed July 1, 1926      10 Sheets-Sheet 3
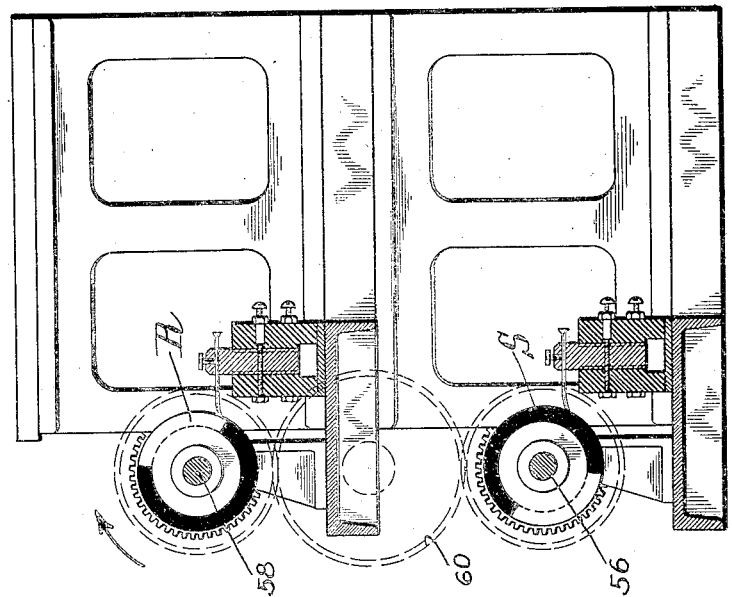
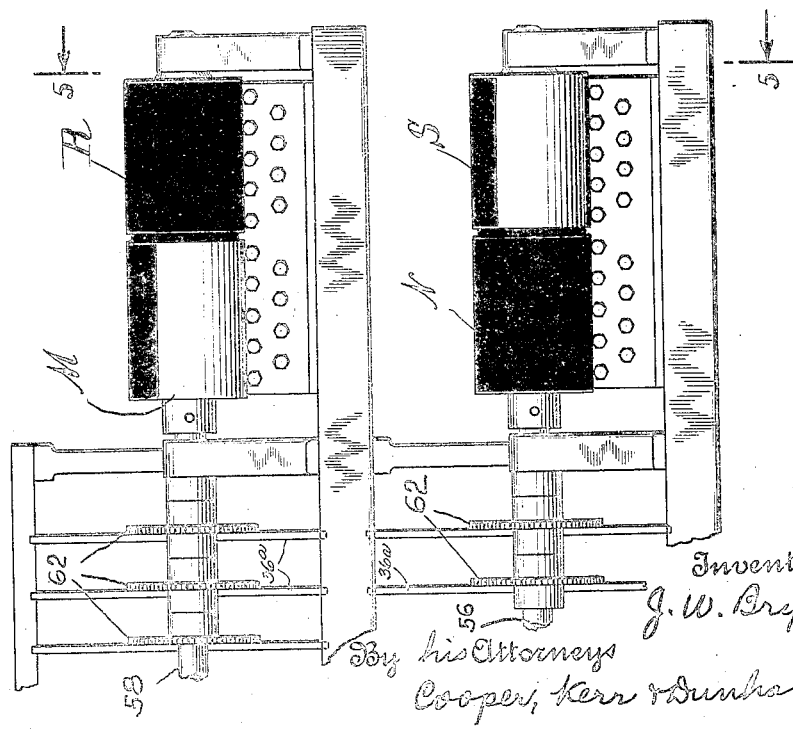

March 13, 1934.  J. W. BRYCE  1,950,475
TABULATING MACHINE
Filed July 1, 1926   10 Sheets-Sheet 4
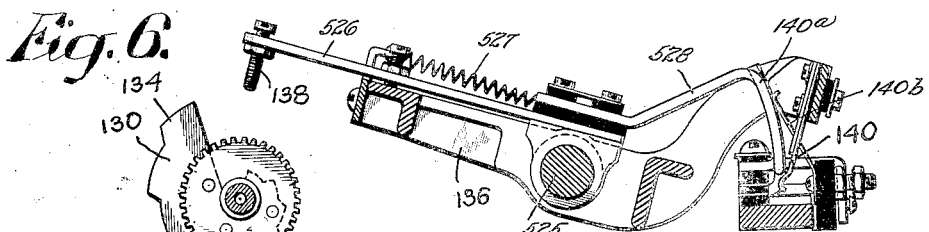
Fig. 6.
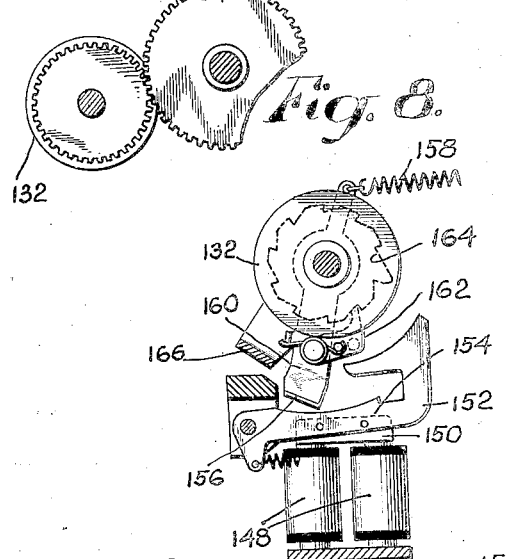
Fig. 7.
Fig. 8.
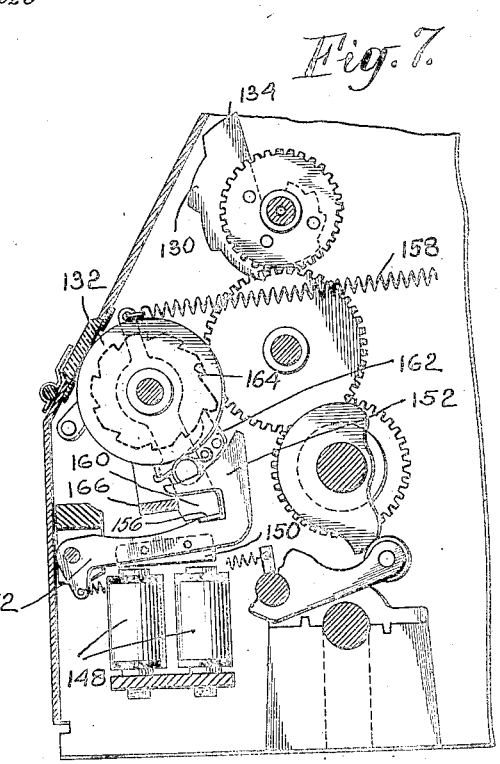
Fig. 9.
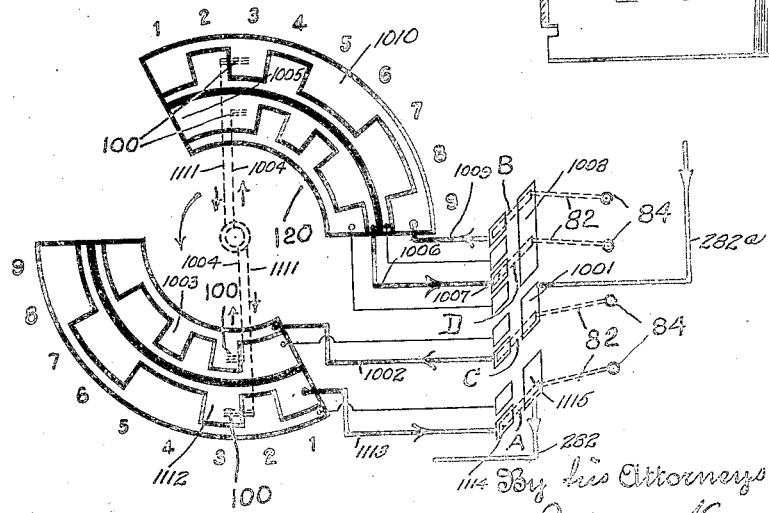
Inventor
J. W. Bryce
By his Attorneys
Cooper, Kerr & Dunham March 13, 1934.   J. W. BRYCE   1,950,475
TABULATING MACHINE
Filed July 1, 1926   10 Sheets-Sheet 5

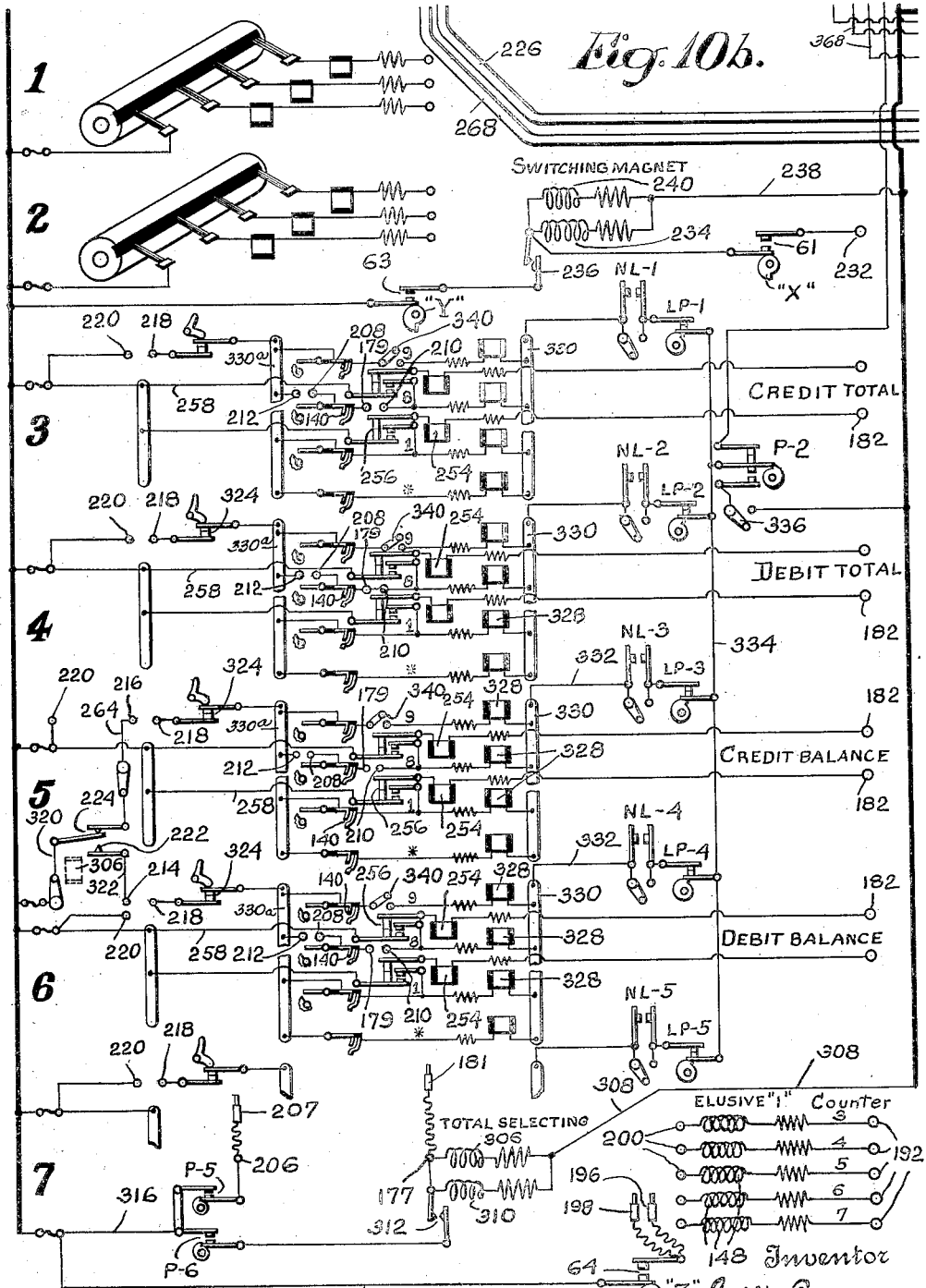

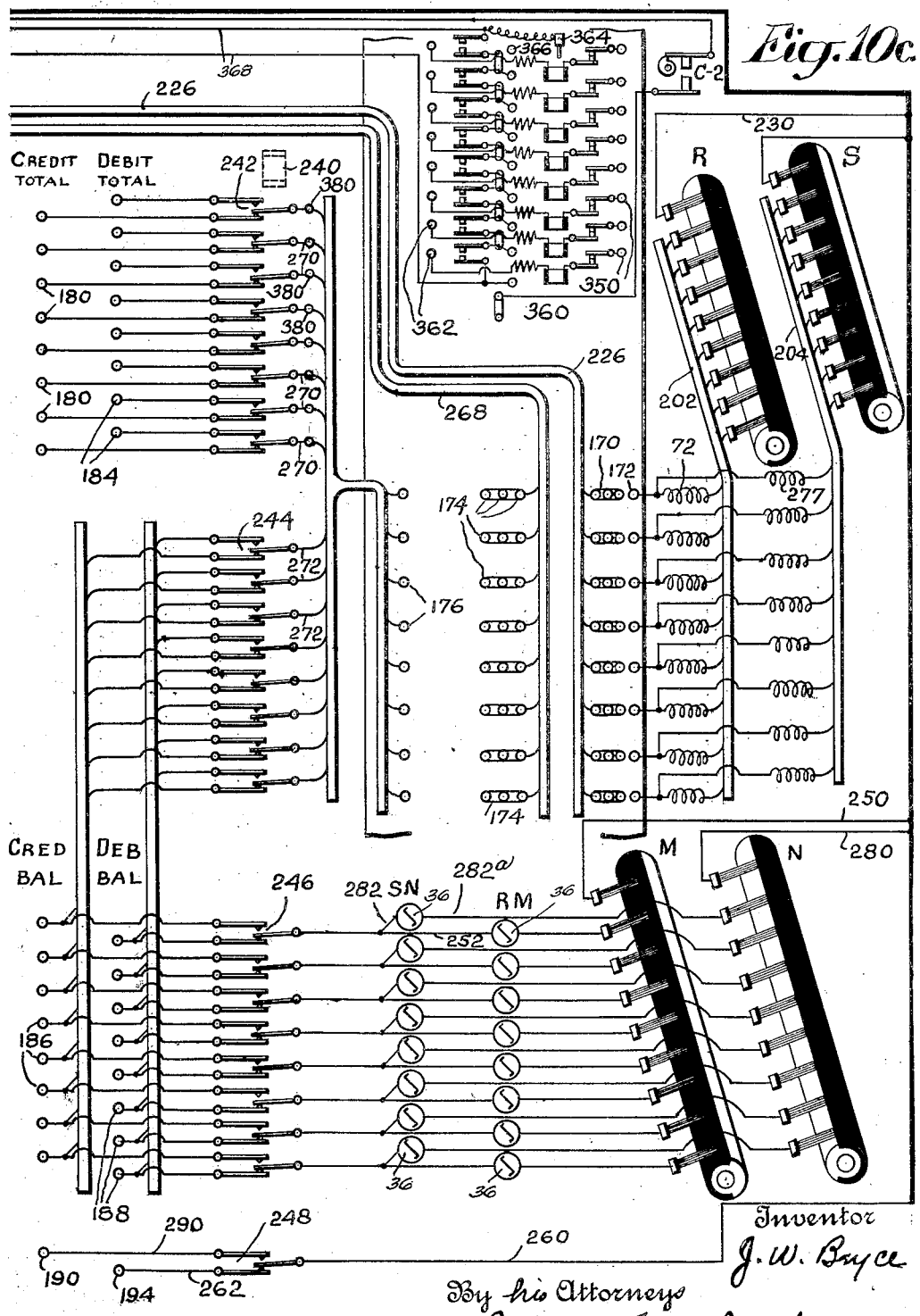

March 13, 1934.  J. W. BRYCE  1,950,475
TABULATING MACHINE
Filed July 1, 1926   10 Sheets-Sheet 8

Inventor
J. W. Bryce
Attorneys
Cooper, Kerr & Dunham

March 13, 1934.  J. W. BRYCE  1,950,475
TABULATING MACHINE
Filed July 1, 1926   10 Sheets-Sheet 10
Fig. 14.
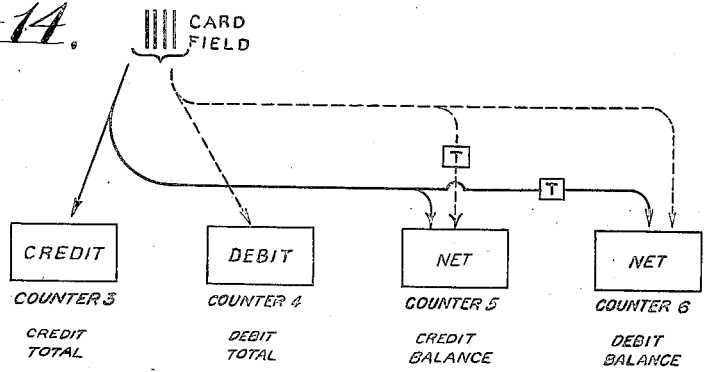
Fig. 15.
| Credit Total | Debit Total | Credit Balance | Debit Balance |
|---|---|---|---|
| 9430 | | 9430 | 99990569 |
| | | | 1 |
| 671 | | 671 | 99999328 |
| | | | 1 |
| | 10254 | 99989765 | 10234 |
| | | 1 | |
| 70629 | | 70629 | 99929370 |
| | | | 1 |
| | 1110 | 99998889 | 1110 |
| | | 1 | |
| | 899 | 99999100 | 899 |
| | | 1 | |
| 80730* | 12243* | 00068487* | 99931513* |
Fig. 16.
| Credit Total | Debit Total | Credit Balance | Debit Balance |
|---|---|---|---|
| 9430 | | | |
| 671 | | | |
| | 10254 | | |
| 70629 | | | |
| | 1110 | | |
| | 899 | | |
| 80730* | 12243* | 68487* | |
Fig. 17.
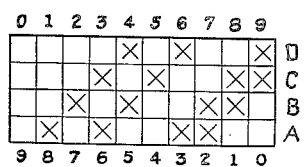
Inventor
J. W. Bryce
By his Attorneys
Cooper, Kerr & Dunham Patented Mar. 13, 1934

1,950,475

UNITED STATES PATENT OFFICE 1,950,475

TABULATING MACHINE

James W. Bryce, Bloomfield, N. J., assignor, by mesne assignments, to International Business Machines Corporation, New York, N. Y., a corporation of New York Application July 1, 1926, Serial No. 119,803

49 Claims. (Cl. 235—92)

This invention relates to improvements in accounting machines and more particularly is related to accounting apparatus which will receive different classes of entries such as debits or credits and which will finally give by the operation of the machine a true net balance whether negative or positive, i. e. debit or credit.

In this application various kinds of amounts are discussed, for instance positive amounts, negative amounts, complements of positive amounts, complements of negative amounts, etc. In order to avoid possibility of confusion as to the meaning of the specification, I shall designate as a "true" amount any number, whether positive or negative, which directly indicates the value of that amount above or below zero. A true negative balance is the kind of balance usually referred to by accountants as being "red", or "in red ink", and I shall, to insure clarity of description and to avoid all possibility of misunderstanding, sometimes refer not only to true negative balances as being "red" but also may designate as "red" any items or amounts which reduce the true positive balance or increases the true negative balance. A positive balance, and amounts which increase the positive or decrease the negative balance may be referred to as "black" amounts.

If debit and credit items are entered in the usual accounting apparatus which is arranged to handle positive and negative amounts, a result will ultimately be secured which may show a true positive balance (black) or a number which is a complement of the true negative (red) balance. To take care of such conditions shutter devices have been used to convert the undesired complementary figure into a true number for visual observation. While such shutter devices may enable the machine to display the true balance, they are of no utility in properly printing the result.

Other machines have been designed which print the true balances whether negative or positive, but do not show the true negative balance for visual inspection, but only the complement thereof. No previous apparatus has been able to automatically handle positive and negative items indiscriminately, to show the true balance whether black or red, and to print the true balance whether black or red. In addition, the present machine lists the debit and credit items, displays the totals thereof at all times, and prints those totals whenever desired.

According to the present invention two separate counters or totalizers are employed for accumulating the totals of true positive (black) and true negative (red) items respectively. Into one or the other of these counters all true amounts only are selectively entered, all true positive (black) items going into one counter and all true negative (red) amounts into the other counter. Therefore, one of the counters accumulates a total of true positive (black) amounts and the other counter accumulates a total of all true negative (red) amounts.

Simultaneously with the above action the same amounts are entered into a second pair of counters, which are called balance counters, all true positive (black) amounts going into one of them and all true negative (red) amounts going into the other. Also, in this pair of balance counters the complements of all true positive (black) amounts are entered into the counter which is accumulating the true negative (red) items, and the complements of all true negative (red) amounts are entered into the counter which is accumulating the true positive (black) items. Briefly, one of the balance counters accumulates all true positive items plus the complements of all true negative items, and the other balance counter accumulates all true negative items plus the complements of all true positive items. This means that if the total of the true positive amounts exceeds the total of the true negative amounts, a true number will appear in the first balance totalizer and the complement will appear in the second balance totalizer. Conversely, if the total of the true negative amounts entered in the totalizers exceeds the sum of the true positive amounts which are entered in the totalizers, the second balance totalizer will show a true negative amount and its complement will appear in the first balance totalizer.

The machine is provided with means to determine which totalizer shows a true number and which one shows a complement. This true number is then read from its totalizer and printed by a printing mechanism, and by the printing mechanism the character of the number, whether true positive or true negative, i. e., credit or debit is indicated.

It has been customary to designate a certain counter as a "balance" counter or accumulator, or totalizer, but such a designation is misleading, because it is impossible to have a single counter show both true positive and true negative amounts without supplemental complicated reading devices. Consider a counter arranged to show true positive (black) balances of indiscriminate positive (black) and negative (red) items entered into it. So long as the total of black items exceeds the total of red items the counter will show the true black balance, or in other words the difference between the number representing the balance and zero. But just as soon as the total of the red items exceeds the total of the black items the counter shows not the true red balance, which is the difference between that amount and zero, but a number which is the difference between the desired balance and 100,000,000 (in the present machine), thus requiring manipulation of some sort to determine what the true red balance may be. On the other hand, if the counter be arranged to show true red balances, it will show, whenever the total of black items exceeds the total of red items, not the value of the black balance as compared to zero but will show it as compared to 100,000,000, and such a showing is of no direct interest.

Positive amounts are on one side of zero and negative amounts are on the other side of zero. It is necessary to show both, or either, with reference to zero as the basis of comparison. It is not sufficient to have one amount compared to zero and the other to some other number, whatever it may be.

It will therefore be clear that it is necessary to have two counters, a "black" counter traveling upwardly from zero to show true positive balances, and a "red" counter traveling downwardly from zero to show true negative balances.

According to the present invention provision is made for the identifying of the true positive and true negative amounts, for the separate accumulation and listing of these amounts, for the disclosing and printing of the totals thereof, for the listing of the items both positive and negative one after the other, and for the printing of the separate totals of both positive and negative amounts. Provision is also made for securing the net total or balance, and printing the balance as a true number properly identified as to its character.

Provision is made for printing the records upon a sheet in various relative arrangements as to their columnar position.

The machine can also be utilized for obtaining the net balance of entered items and printing the net balance without printing or adding the positive and negative items or totals thereof separately.

The accumulators used for any of the above purposes are normal accumulators and may be used for work of the usual tabulating nature whenever they are not being used for the special purposes herein discussed.

If the fact is known in advance that the ultimate result will be either positive or negative, a single appropriate totalizer only need be used, no totalizer being used for accumulating the amount that will be a complement.

The machine is also adapted to give the current net balance after each item is entered, if desired.

The invention accomplishes the above results in connection with a record controlled tabulating apparatus. Provision is made for automatically deriving the items from the records, sensing the character of the items and for automatically entering the amounts properly in the machine according to character and amount. Provision is made for securing extreme flexibility in mode of operation and results and in the securing of new results not heretofore possible in machines of this particular character or in accounting machines generally.

As a record controlled tabulator the machine is also adapted to handle records punched in a complementary manner and to properly enter the items in the machine. Complementary punching is a well known expedient to enable negative amounts to be handled in present types of machines. In the ordinary use of the present machine such complementary punched cards are unnecessary and it is one of the objects of the present invention to secure the results previously secured with complementary punched cards without the necessity of such special punching. One particular difficulty with complementary cards is that the punch operator has not only to convert each number into its complement but he must also take into account the "elusive one" which is always encountered when dealing with complements. With the present machine not only is the necessity for such special punching obviated but the machine itself automatically takes care of the elusive, or fugitive, "1", and renders unnecessary the conversion in reading necessary whenever the tabulator discloses a complementary balance, as has been the case heretofore with complementary card controlled machines whenever such balance was negative. Double card punching, with true numbers and complements both punched, is also rendered unnecessary.

Provision is made for automatically taking and printing a net balance upon a change of record group, which balance may be an intermediate balance or final balance as desired. After this balance is taken the machine may automatically resume tabulating upon a new group or upon a continuation of the old group, repeating the balance taking operation as often as such operation is called for.

The machine can be used for converting each item or amount into its complement and for printing such complementary amount.

Other objects of the present invention reside in the improvement of existing machines to the general end that the use of these machines may be extended to perform additional functions without complete reconstruction and redesign of the machine but by merely adding to the existing machines certain new attachments and appurtenances.

Further objects, uses and advantages of the present invention will be hereinafter pointed out in the accompanying specification and claims and shown in the drawings, which show by way of illustration what I now consider to be a preferred embodiment of the invention.

Fig. 4 is a view of commutators, taken on line 4—4 of Fig. 3.

Fig. 5 is a view on line 5—5 of Fig. 4, showing an end view of commutators and their brushes.

Fig. 6 is a sectional view of the selecting device of each totalizer or counter.

Fig. 7 is an elevation of the so-called "elusive one" magnet and supplementary devices in each totalizer or counter.

Fig. 8 is a detail view of the devices shown in Fig. 7.

Fig. 9 is a diagrammatic representation of the brush and commutator arrangement used in connection with the setup mechanism of the translator.

Figure 10A:
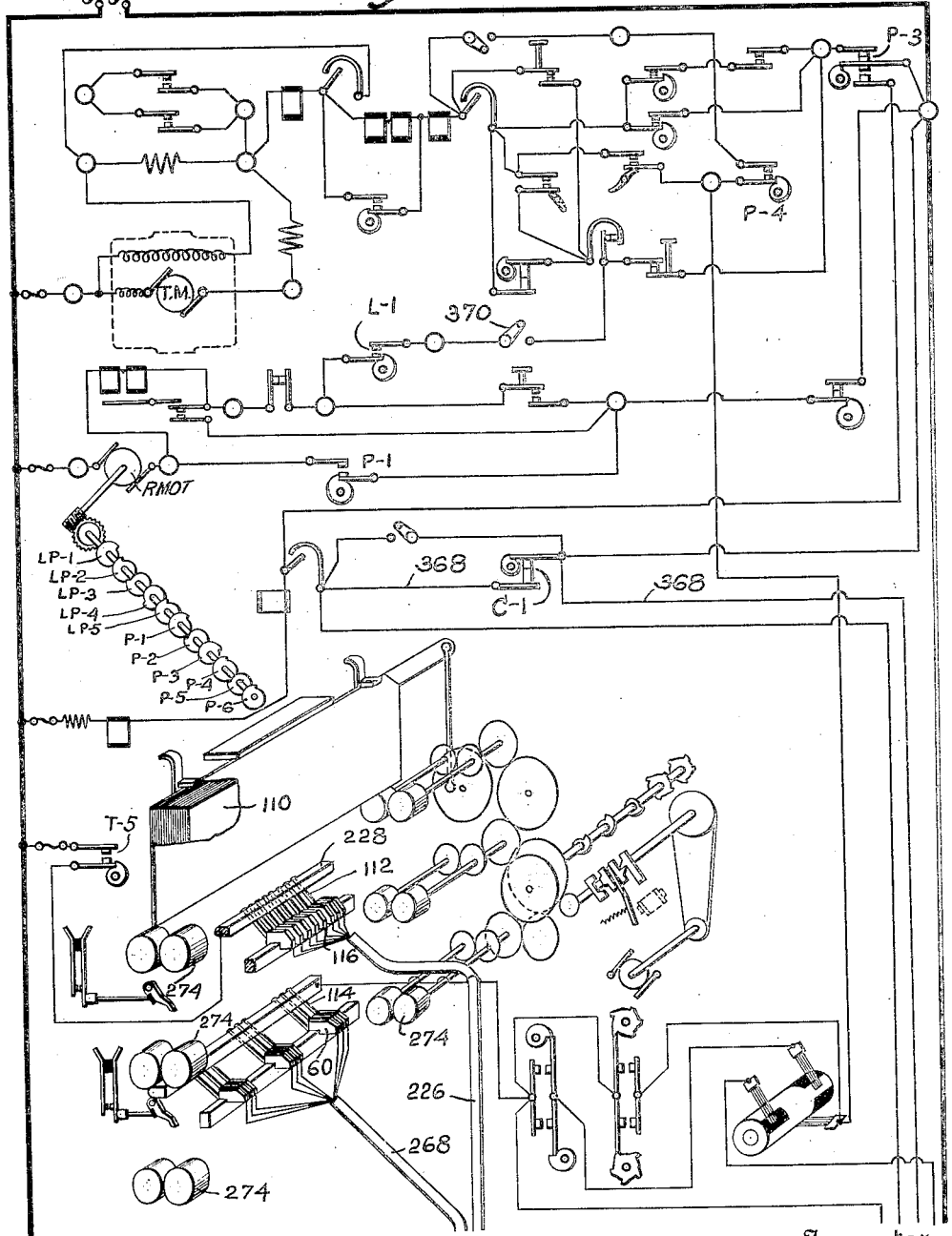

Figs. 10a, 10b and 10c used together constitute a wiring and plugboard diagram of the machine.

Figure 11:
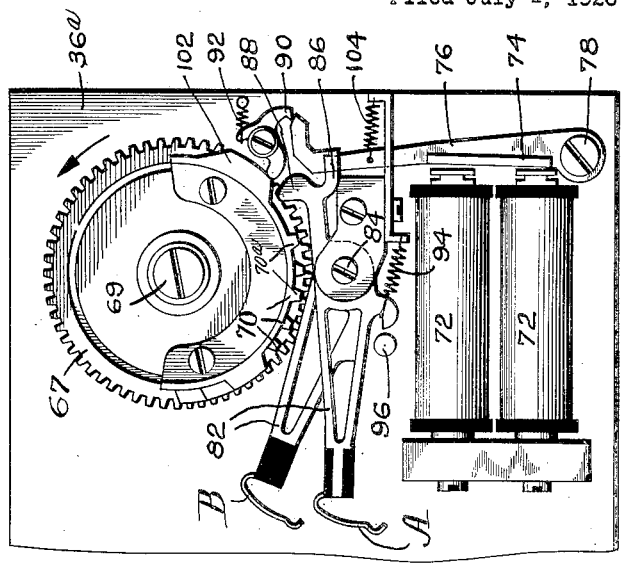

Fig. 11 is a detail view of the setup mechanism.

Figure 11A:
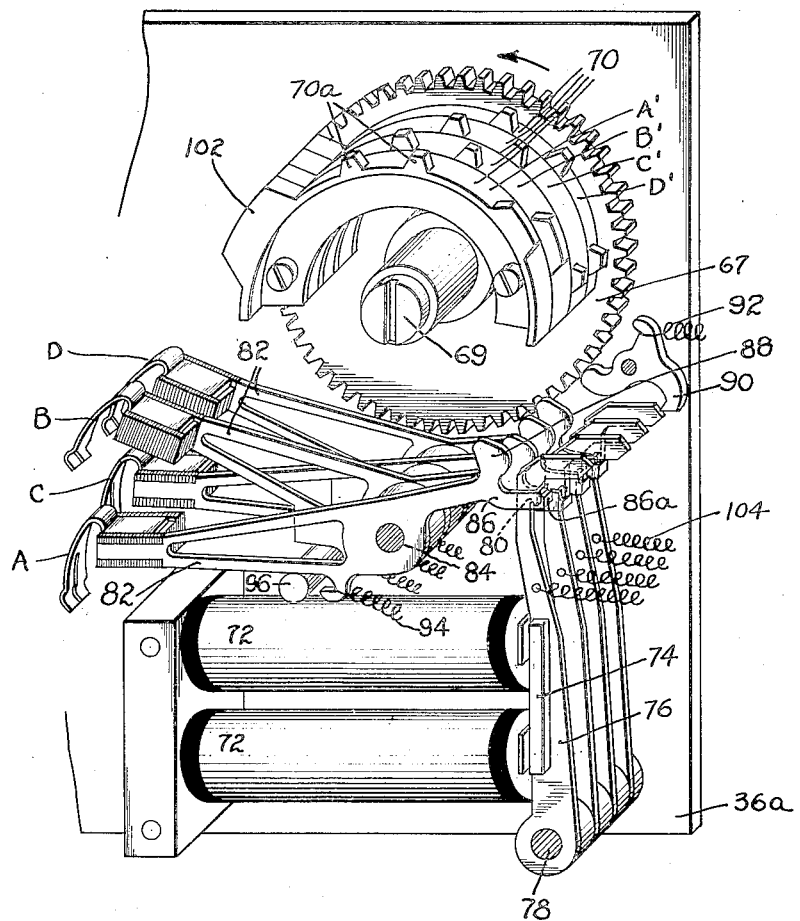

Fig. 11a is a perspective view of the mechanism shown in Fig. 11.

Figure 12:
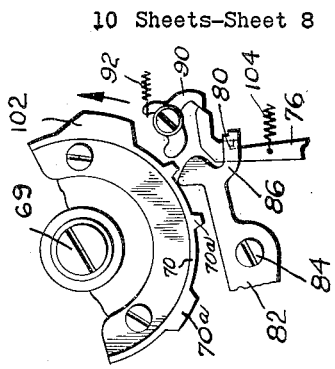

Fig. 12 is a detail view of a portion of the mechanism in Fig. 11.

Figure 13:
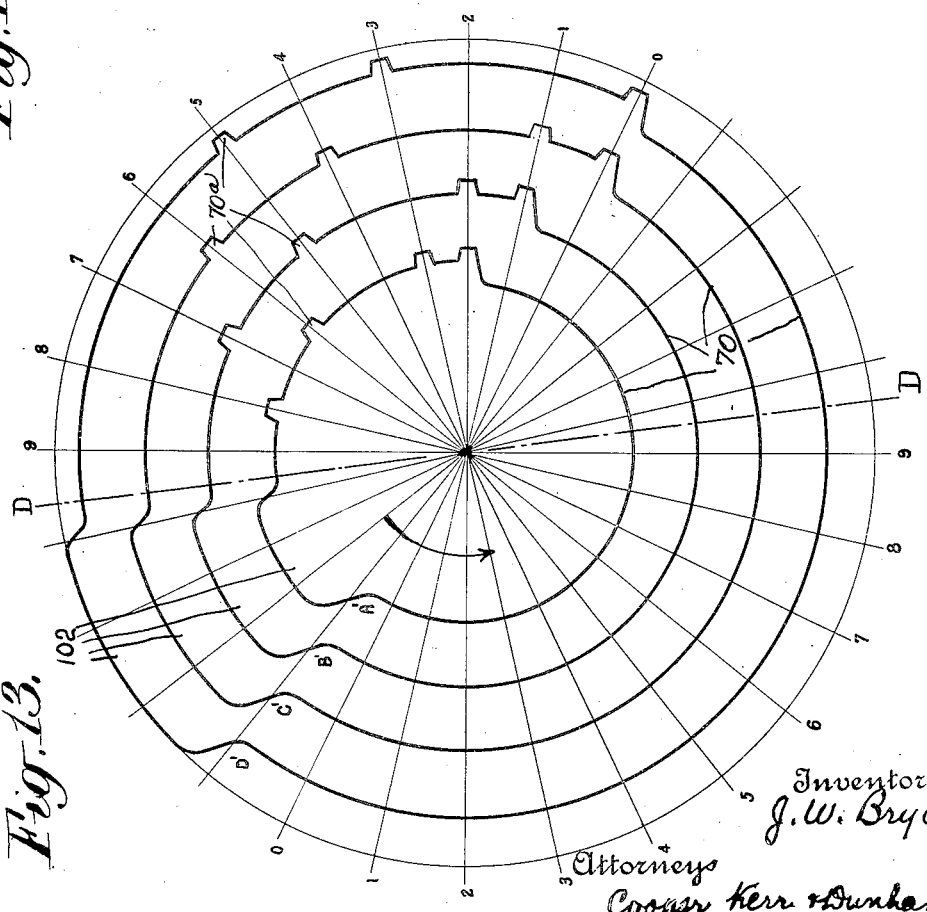

Fig. 13 is an enlarged view of a series of cams used with the setup mechanism.

Fig. 14 is a diagram showing the distribution of items and complements thereof to various totalizing and balancing counters.

Fig. 15 is a chart showing various entries and the method by which the machine arrives at the net balance of those entries.

Fig. 16 shows one kind of printed record which may result from the entries in Fig. 15.

Fig. 17 is a diagrammatic chart of the code used in connection with cams shown in Fig. 13, and the brush and commutator arrangement shown in Fig. 9 to change each figure to its nine-complement.

The machine illustrated in this application is substantially the same as that described and claimed in the application of Daly and Page, Serial No. 6980, filed February 5, 1925, issued as Patent No. 1,762,145, June 10, 1930 only sufficient changes and additions being made to adapt the machine for the present purposes.

There are two rows of brushes, one row being above the other, one card cycle apart. The cards are fed downwardly past the upper set of brushes, and then, exactly one card cycle later, past the lower brushes.

For purposes of description I have illustrated the machine arranged to analyze debit and credit items punched in a certain field in the card, to list and totalize all debit items, to list and totalize all credit items, to print the totals of debit and credit items, and to print the true balance of the above totals whether positive or negative. The above data may be printed in any desired fields on the record sheet.

While the card is passing the upper brushes the amount punched in the card is read therefrom into a translating device which sets up the complement of the amount.

While the card is passing the lower brushes the amount punched in the card is read therefrom directly into the proper accumulators, while at the same time the complement (which had been set up while the card was passing the upper brushes) is read from the translating device into an appropriate accumulator.

It will be noted that the translating apparatus is receiving an item from the upper brushes at the same time it is transmitting the complement of the next preceding item to an accumulator. This makes it necessary to build the translating device in dual form so that one section may be receiving and setting up one item while the other section is transmitting a different item to an accumulator.

As the card is leaving the upper brushes a perforation provided for the purpose informs the machine whether the item on that card is a debit or credit; and the machine acts in accordance with that information to distribute the items in appropriate form to the proper accumulators.

For the above purpose four accumulators are required. They are shown diagrammatically in Fig. 14. For clarity of description these particular counters will be referred to as Credit total, Debit total, Credit balance, and Debit balance, i. e., it is assumed that the first counter is to be used for obtaining totals of credits only, the second counter for totals of debits, the third for a credit balance if it shows a true positive total, and the fourth for a debit balance if it shows a true negative total.

As a credit card passes through the machine, it is added at its face value in the Credit total counter, nothing is added in the Debit total counter, it is added at its face value in the Credit balance counter, and its complement is added in the Debit balance counter. Conversely, if a debit card passes through the machine it is added at its face value in the Debit total counter, nothing is added in the Credit total counter, its complement is added in the Credit balance counter, and it is added at its face value in the Debit balance counter.

In Fig. 14, the full l'nes indicate the path of credit items, and the dotted lines indicate the path of debit items. In the diagram T represents the translator through which the items pass to be converted into complements.

A specific example of the operation of the machine is shown in Figs. 15 and 16.

With reference to complements, it will be noted that the complement of a number is arrived at in this invention in the following manner. The invention is disclosed as applied to a tabulating machine, of which each counter is provided with nine counting or accumulating wheels. The wheel on the extreme left of each counter is arranged to receive entries only by transfer from the next lower wheel, and the other eight wheels may receive entries from the controlling cards. When a counter is used for subtracting operations, according to the invention, the eighth wheel, counting from the right is used to determine whether the balance on the counter is positive or negative, and, as will appear later, the reading on this wheel should always be either nine or zero. The largest balance, therefore, which can be obtained on this machine consists of seven figures, and the items entering into the subtracting operation should not contain more than seven figures. As in all subtracting operations by the complemental process, the complement of a digit must be entered upon each wheel of the counter, which can be controlled directly from the entering mechanism; that is, any zeros to the left of the first significant figure of an item to be subtracted must be entered upon the counting wheels as nines. The complement of an item composed, as they are in the present examples, of seven or less digits is the difference between 100,000,000 and that number. A convenient method of obtaining this complement is to let each digit of the number, including zeros to the left of the last figure, be subtracted from "9" and then add "1" to the right hand figure of the remainder. This is a convenient and infallible method of obtaining the complement of a number of several digits.

In the example shown in Fig. 15, the first credit item, 9430, is added in the Credit total counter, and in the Credit balance counter as a true number and is added in the Debit balance counter as a complement. This is done by adding 99990569 plus 1 to form a true complement as described above. The other credit amounts are treated in the same way. The first debit item 10234 is added as a true number in the Debit total and Debit balance counters, and its complement is added as 99989765 plus 1 into the Credit balance counter in the manner previously described. The other debit amounts are treated in the same way.

When the machine has finished its adding operations and is ready to total-print provided that the subtracting capacity of the machine has not been exceeded, there will always be one of the net balance counters showing a "9" in the eighth column. A "9" in the eighth column (from right to left) still assuming that the subtracting capacity of the machine has not been exceeded, always indicates that the total is a complement, and should not be printed. The fact that this "9" appears is utilized, in a manner to be later explained, for suppressing the printing of that total and at the same time printing the balance total from the other balance counter which will in all cases be a true number. This means, in Fig. 15, that the number 99931513 appearing in the Debit balance counter, is a complement, and we are not particularly interested in it. The fact that its eighth digit to the left is a "9" insures that the printing of that number will be suppressed and that the number appearing in the Credit balance counter will be printed because it is a true number. The zeros at the left are suppressed when printing true numbers in a well known manner which forms no part of the present invention.

Fig. 16 shows the example just described in Fig. 15 as it will normally be printed on the record sheet, showing individual debit and credit items, total of the debit items, total of the credit items, and the net balance, which happens to be a credit balance. However, if desired, the listing of individual items may be suppressed, printing only the totals.

Figs. 3, 9, 11, 11a, 12 and 13 show the mechanism used to convert each digit of a number into the difference between itself and "9". This mechanism is more fully described in detail in copending application of Bryce & Mills, Serial No. 108,834, filed May 13, 1926, for which a continuation in part was filed May 21, 1928 under Serial No. 279,308, which continuation in part has now issued as Patent No. 1,729,028, September 24, 1929. Both the original application, Serial No. 108,834, and the continuation in part, application Serial No. 279,308, contained a full disclosure of the mechanism for translating single hole perforations on cards into their complementary numerical values for entry into accumulators according to the principles made use of in the present case. I am describing here only enough of this translating mechanism to show its application to the present machine.

The Bryce and Mills mechanism is utilized in the present apparatus to issue from itself a timed impulse which represents in effect the difference between the digit represented by the input impulse and "9". The digits taken from these inverter units form a number which is one less than the true complement of the number thrown into the inverters or translators. This number becomes the true complement after "1" has been added to the right hand column as explained above.

Figure 1:
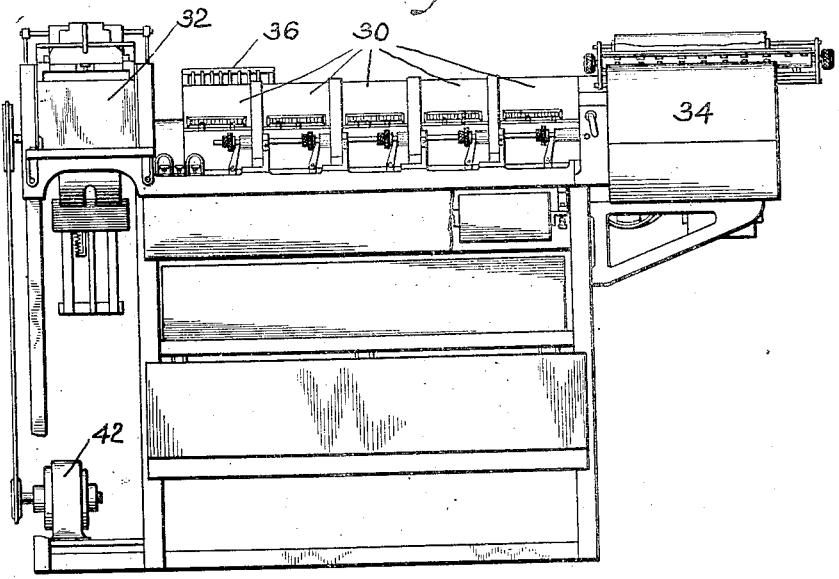
Fig. 1 is a front view of the electric tabulating and accounting machine complete.
Figure 2:
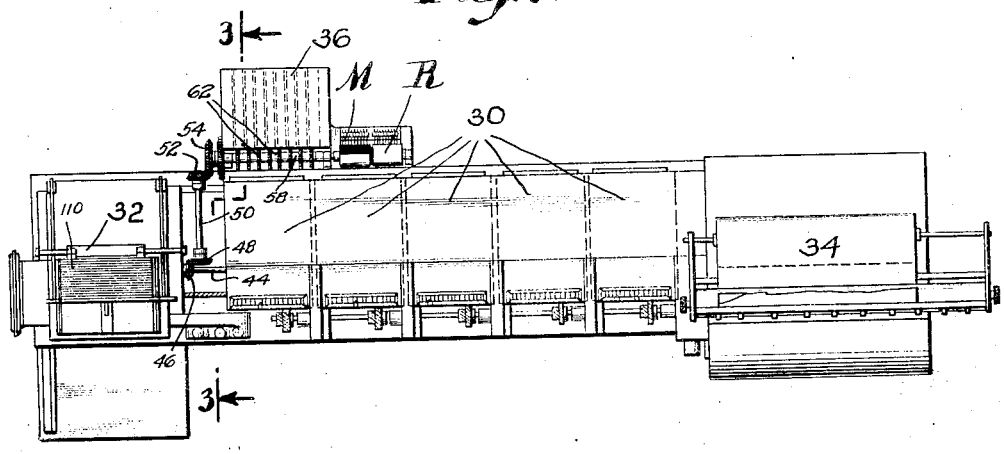
Fig. 2 is a plan view of the machine showing gear drive for translating units and commutators for supplying current to these units during alternate cycles of the machine.

The tabulating machine (Figs. 1 and 2) comprises a bank of five counters or accumulators 30, a record feeding section 32, and a printing section 34. Secured at the rear of the machine is the bank of translating units 36 and their commutators M, N, R and S (Figs. 2, 4 and 5). Power for the machine is supplied by motor 42.

Figure 3:
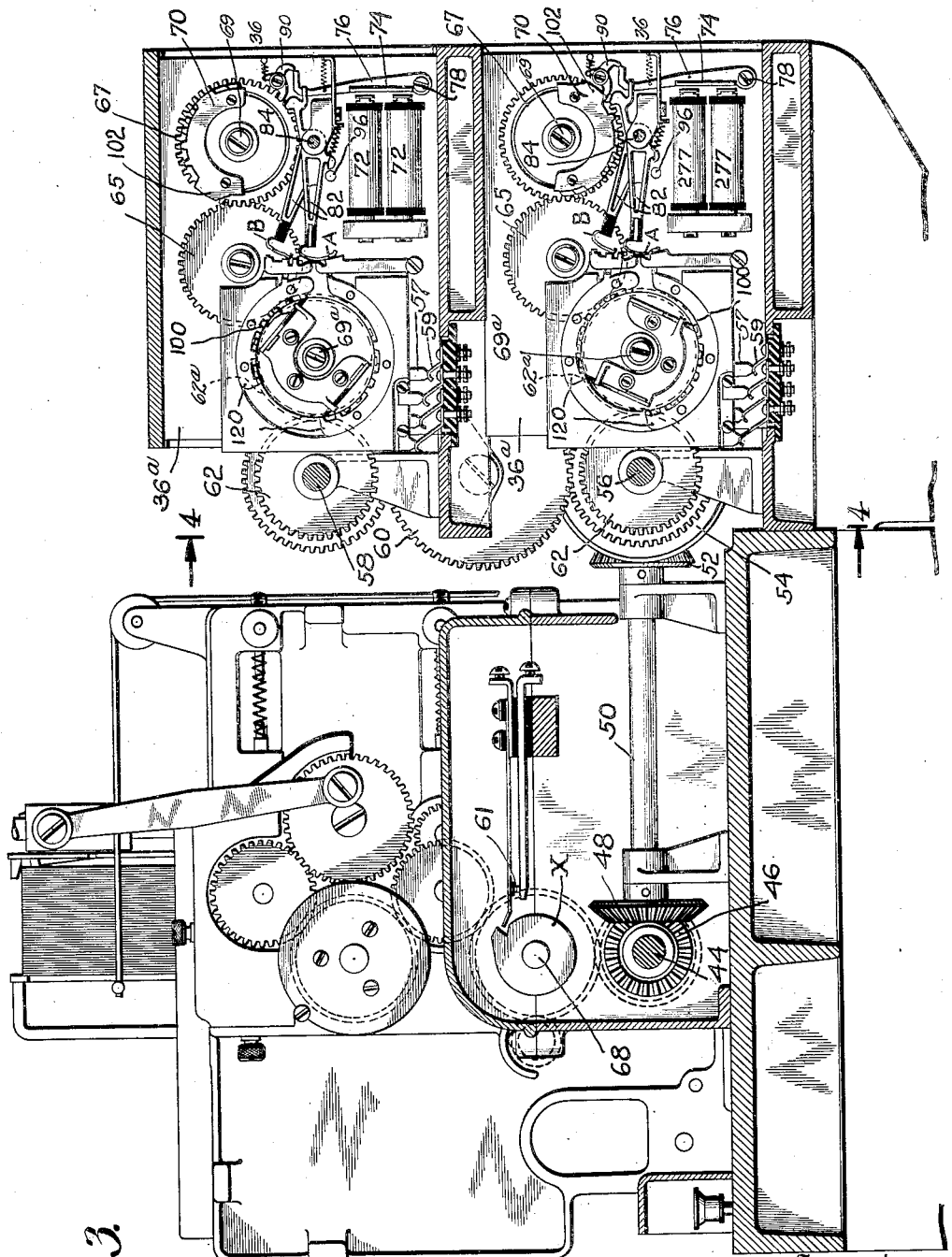
Fig. 3 is a sectional view, on line 3—3 of Fig. 2, showing an inverting or translating unit in place on the machine and method of driving it.

Figs. 3, 4 and 5 show the translating mechanism as used in the present invention. Referring to the figures more in detail, the translating mechanism comprises a bank of units 36 (Fig. 3), two units being employed for each index column of the controlling record devoted to balancing. By "bank" is meant two sets of eight each. As stated above, two of these units are used for each column devoted to balancing, one of them being set up from the record card while the other is reading out its inverted setup into the counter which has, by means later to be described, been selected as the counter to receive the complement at that particular time.

Power is supplied to the translating mechanism through tabulator shaft 44, bevel gears 46 and 48, shaft 50, and bevel gears 52 and 54. Gear 54 is fast on shaft 56 and from shaft 56 shaft 58 is driven by means of intermediate gear 60. Gears 52 and 54 are in 2:1 ratio so that shafts 56 and 58 make one half revolution for each complete revolution of tabulating shaft 44. Fast on shafts 56 and 58 are gears 62 which serve to drive the upper and lower translator units, there being one gear 62 for each unit.

Each translator unit is mounted on a base plate 36a, and held thereby in mesh with gear 62, which makes one-half revolution per card cycle. Current is supplied through a number of contacts 59 and 57 which contact automatically whenever the unit is placed in position in the machine. This construction permits the units to be removed and interchanged at will without connecting or disconnecting wires. The accumulator elements are driven from the card feed unit in the usual manner. One form of accumulator to which this invention may be applied is disclosed in a patent to Lake, No. 1,307,740, dated June 24, 1919. Inasmuch as the accumulator and its actuating mechanism form no part of this invention a more detailed description is not given herein.

Cams X, Y, Z (Figs. 3 and 10b), operating contacts 61, 63 and 64, whose functions are explained later, are attached to shaft 68 and revolve in conjunction therewith, shaft 68 being driven by gearing from shaft 44 to make one revolution per card cycle.

On shafts 58 and 56 (Figs. 4 and 5) are also mounted commutators or circuit shifting devices M, N, R, S, which by means of brushes associated therewith serve to control the flow of current into and out of the translating units. Circuits shifting devices R and S are used to alterante the entry of the amounts from the upper brushes into one or the other of the sets of translators, and circuit shifting devices M and N are used to alternate the transmission of the translator or inverter amounts from the one or the other set of translators to the accumulators or counters. R and M operate with the one set of translators and S and N operate with the other set of translators.

I shall later (Fig. 10c) represent the translator units diagrammatically, and for clarity of description I shall designate by R M the set which is electrically connected to the operating circuits by devices R and M and shall designate by S N the set which is electrically connected to the operating circuits by devices S and N.

These circuit shifting devices are so timed as to energize the lines connected to brushes on M commutator (Figs. 4 and 5) and those leading from N commutator during alternate revolutions of the card feeding mechanism; and so as to energize the lines connected to brushes on R commutator and those leading from S commutator on alternate revolutions. However, commutators M, N, R and S are also so timed that R commutator is not energized during that cycle when M commutator is energized, and that N commutator is not energized during the cycle when S commutator is energized (and vice versa).

Referring to Fig. 3, the translating units are mounted in pairs one above the other and are so timed that during any revolution of the machine one unit is receiving an impulse from the card and setting it up in the translator, while the other unit is transmitting its previously received impulse to the accumulator in its translated form. On the succeeding revolution this action is reversed, the one unit transmitting its translated impulse, while the other unit is receiving a new amount from a card and setting it up.

The set-up mechanism (Figs. 3, 11, 11a, 12 and 13) is driven from gear 62 through a gear 62a on stud 69a and gears 65 and 67. This gear train drives gear 67 one revolution for each revolution of gear 62. Gear 62, in turn, is driven from the tabulator shaft 44 with a 2:1 ratio, so that gear 62 makes one half of a revolution during each machine cycle. Gear 67 is provided with four cams 70 which are rigidly fixed to it and revolve in conjunction therewith. Magnet 72 (277 in lower unit) is provided with four armatures 74 to each of which is rigidly attached an arm 76. Arms 76 are pivoted on a rod 78 and terminate at their free ends in detents comprising undercut slots 80. Arms 82 pivoted on rod 84 are provided at their free ends with a set of contact elements or brushes A, B, C and D, respectively, and at their other ends with projections 86 and 88. Projections 86 have sidewise extensions 86a on their ends which enter slots 80 in arms 76 and normally lock the latter against movement.

As cams 70 (of which there are four, denoted A', B', C', D') are rotated with gear wheel 67, cam projections 70a on cams 70 depress at various points in the machine revolution one or more of the projections 88 on the various arms 82 and disengage extensions 86a from slots 80, releasing the corresponding arms 76 to permit movement thereof upon energization of magnet 72. Although all of the armatures are attracted whenever magnet 72 is energized, only those armatures which are released by cams 70 at that particular time are permitted to move, the other armatures being held in a stationary position by the detent means above described.

When the cams 70 have released one or more armatures for movement and magnet 72 has at the same time been energized, any released armature 74 is attracted and together with arm 76 is moved to the left. Any arm 76 that is moved to the left by energization of magnet 72 is then held by a pawl 90 (Figs. 11 and 12) which is drawn into position by its spring 92 and holds arm 76 in its set-up position. Then as cams 70 continue on their revolution, subsequent projections 70a on each cam 70 will cause the cooperating lever 82 to move up and down until finally, after the last projection 70a on cam 70 has passed and a low portion of the cam occurs, it assumes its true set-up position which will be determined by the position of arm 76. Thus if any arm 76 has been moved to the left and been latched in position by pawl 90 the arm 82 associated therewith will be drawn by spring 94 into its set-up position resting on stop 96, as shown for the outer arm 82 in Fig. 11a and also if any arm 76 has not been moved to the left the arm 82 associated therewith will retain the elevated position shown in Fig. 11.

A combination having been set up by contact elements or brushes A, B, C and D, it may be translated by brushes 100, Fig. 9, to produce an impulse in the counter magnet 254 (see also Fig. 10b) at the required instant. Fig. 9 merely shows the circuit through the translator, other elements having been omitted for the sake of clarity. In this figure, contact elements or brushes A and C have been shifted, and, by tracing the heavy line circuits, it will be noted that an impulse will be initiated when the brushes 100 which are attached to gear 62A (see also Fig. 3) are in the 3 position, whereby 3 will be entered into the accumulator. Final resetting of any arm 82 to its normal elevated position, as in Fig. 11, is then accomplished by the long high projection 102 on the corresponding cam 70, which first engages projection 88 on such arm 82, moving arm 82 in a clockwise direction, and afterwards releases pawl 90, allowing spring 104 to move arm 76 into its right hand or normal position. Then, when projection 88 on arm 82 drops off, projection 102 on cam 70, arm 82 will assume one of the positions shown in Fig. 11.

The set-up mechanism just described is operated in response to record cards 110 (Fig. 10a) which are successively passed under upper brushes 112 and thence one revolution later under lower brushes 114, there being one brush 112 and one brush 114 for each card column being analyzed. Whenever a card is passing the upper row of brushes and a brush 112 senses a perforation in the record card, contact is made on the cooperating metallic member 116 to complete a circuit through magnet 72 (see also Fig. 10c) which is temporarily energized. Magnet 72 will then attract its armatures and the particular one or ones which happen to be released by cams 70 at that instant will be moved to the left, and corresponding arms 82 allowed to drop at the end of a machine revolution to the set-up position as above described.

A standard tabulating record card of the well known form (Hollerith) is employed with this machine, each position from 0 to 9 on the card being represented in the translation by a combination of contacts of one or two released levers 82, which form circuits in conjunction with contacts of the other levers 82 which retain their normal position. In order that the machine may know whether a card carries a credit or debit amount it is customary to mark each debit card with a particular identifying perforation or notch, a convenient method being to punch a hole in one of the commonly unused index positions above the zero position on the card. The perforation may be in any convenient column. If desired, the debit cards may be left plain and the credit cards marked. I shall now explain how readings taken from the cards may be converted into complements.

Referring to Fig. 17, every "X" represents a projection 70a on the corresponding cam 70. As the index positions of a card successively pass a given point, the cam projections 70a release one or two of the levers 82 carrying contact elements or brushes A, B, C and D, in accordance with the code illustrated in Fig. 17, and if at that same instant contact is made through a hole in the card to energize the magnet 72 corresponding to the column in which the hole occurs, the levers corresponding to the digit represented by that hole will be thrown over against stop 96 and the desired combination is set up. Fig. 17 illustrates only one of the many codes that may be used.

In Fig. 17 the numerals across the bottom of the diagram, reading from left to right, represent the index positions as they pass the brushes, whereas the numerals across the top represent the set-up that will be made by the cams 70. It will be noted that in every case the set-up will be the nine-complement of the card digit.

Fig. 13 is a diagrammatic representation of a set of cams 70, showing the relative locations of the projections 70a with respect to each other and with respect to the machine timing to convert readings received from the analyzing brushes into their nine complements. The four cams 70, which in actual construction, are all of the same diameter, have been shown as of different diameters so that the locations of the projections 70a will be apparent. Also a separate hump has been shown for each projection 70a, although, in actual practice and as shown in the structural details, certain of these projections which occur in proximity to each other are combined in a single hump, to avoid unnecessary machining of the parts. The radial lines marked with the digits from 0 to 9 indicate the combinations of projections 70a which will be depressing levers 82 (Figs. 11 and 11a) to release them from their latches, when impulses representing the several corresponding digits are received from the analyzing brushes. Thus along the 0 radial line are alined projections 70a on cams C' and D', meaning that an electrical impulse from the analyzing brushes representing 0 will occur when levers 82 carrying contact elements C and D are in condition to be set up. The setting up of contact elements C and D, as will be recalled from the previous explanation of the code and by reference to Fig. 17, results in an electrical impulse to enter 9 into the accumulators. Thus a set up in the translator caused by a 0 impulse from the analyzing brushes results in a 9 impulse for operating the accumulator or, in other words, the nine complement of 0 is entered into the accumulator. In like manner, when an impulse representing 3, for example, is received from the analyzing brushes, contact elements A and D will be set up, as indicated by the fact that projections 70a on the A' and D' cams are alined along the radial line marked 3. A and D, as may be seen from Fig. 17, represent 6 or the nine complement of 3. In the same way any digit received from the analyzing brushes may be translated into its nine complement.

Another example is shown in Fig. 9 in which an impulse has energized magnet 72 at "6", causing levers 82 to shift on the A and C positions. Then, during the revolution of brushes 100 a circuit will be completed as described in the Bryce and Mills Patent No. 1,729,028, issued September 24, 1929, through a commutator 120 at "3" during the next succeeding machine cycle in the following manner (see Fig. 9). Tracing the contacts made during the revolution of brushes 100 it will be noted that due to the arrangement of the commutator segments, when contacts A and C are lowered no circuit can be closed except at the "3" index position of the machine, at which point the circuit may be traced by the following arrows and heavy lines in Fig. 9. This circuit extends into the translating mechanism through wire 282a, conductor 1001, brush C, wire 1002, commutator segment 1003 to brush 100, resting on this commutator segment, and through the brush supporting structure 1004 to brush 100 resting on commutator segment 1005; thence through segment 1005 and wire 1006 to contact plate 1007 and through brush D to contact plate 1008; thence through brush B and wire 1009 to commutator segment 1010, thence through brush 100 resting on this commutator segment and through brush supporting structure 1111 to brush 100 resting on commutator segment 1112; thence through commutator 1112 and wire 1113 to contact plate 1114 and brush A to contact plate 1115 and out of the translating mechanism through wire 282. Note that for convenience the order of brushes in Fig. 9 is changed from A, B, C, D, to A, C, D, B. Note also that brushes 100 are wired in pairs, the two inner being interconnected and the two outer being interconnected.

As mentioned above in connection with the general operation of the machine, of the two net balance accumulators one will, at the end of a tabulating operation as shown in Figs. 15 and 16, always contain a true balance and the other one the complement of a balance provided the capacity of the machine is not exceeded. A true balance is indicated by a "0" in the eighth wheel of the counter, and a complement by a "9" appearing in that same position. This fact is utilized as follows to bring about the printing of the true total.

In Fig. 6 are shown the devices used for printing totals. They are fully described in previous patents, for instance Reissue Patent No. 16,304, issued March 30, 1926, to C. D. Lake. For present purposes it will be sufficient to know that a stepped cam 130 is driven synchronously with each accumulator wheel 132, and whenever bail 136 is rocked downwardly during the total printing operation while the cam is stationary, the position of cam 130 regulates the travel of stop screw 138 (one for each digit), thus controlling the time of closing of the individual contacts 140 and 140a through which the impulses are sent to the printer to print the proper digits. While the manner of closing contacts 140 and 140a is well known and fully explained in Lake Reissue Patent No. 16,304, a brief explanation of the operation will be given at this point. Bail 136 is fixed on shaft 525 and rocked counterclockwise by the latter during the operation of total taking. The arm 526 is freely journalled on shaft 525 and a spring 527, with one end attached to bail 136 and the other end attached to arm 526, causes the arm to follow the bail 136 in its counterclockwise movement. The spring 527, however, permits the arm 526 to stop without interrupting the movement of bail 136. A contact member 528 is mounted on arm 526 and terminates in a curved portion 140a, which throughout its movement, is connected to a total taking circuit of the machine by a contact 140b making sliding contact with it. The set screw 138 moves in the plane of cam 130 and when it encounters one of the steps of the cam, such as 134 for example, the movement of arm 526 and attached contact member 528 is arrested. The movement of the bail 136 continues and the contact 140, mounted thereon and connected in the total taking circuit, encounters curved portion 140a of contact member 528 and thereby completes the total circuit at a time corresponding to the particular step of cam 130 which set screw 138 encounters. As the cam 130 is positioned by the counter wheel, the time of closure of contacts 140 and 140a corresponds to the number which stands on the counter when the total is taken. Whenever screw 138 contacts with the highest step 134 of cam 130 it means that the dig't "9" appears on the correlated register wheel 132. If "9" is found in the eighth wheel of an accumulator it means that the number standing in that accumulator is a complement and should not be printed but suppressed. The suppression is brought about by providing the eighth cam 130 with a step 134 which is h'gher than any of the other "9" steps 134 on the other wheels. The printing operation begins when stop screws 138 reach the position occupied by the normal steps 134. If a complement stands on the accumulator when bail 136 is rocked downwardly stop screw 138 of the eighth column contacts with the extra high step 134, and in the interval of time before the other stop screws 138 reach their printing position the printing circuits are switched to the other counter, thus insuring the printing of the true balance and suppressing the printing of the complementary figure. Details of the switching devices are fully described later in connection with the circuit diagram.

As was previously described in connection with Figs. 15 and 16, it is necessary to add "1" to the right hand column of the counter into which a complement is being added. For this purpose a magnet 148 is provided (Figs. 7 and 8) which when energized will attract its armature 150 to which is fixed latch lever 152, causing the latter to move downward to release latch 154 from 156, allowing spring 158 to bring carry lever 160 into the position shown in Fig. 8, so that pawl 162 may drop into another tooth on ratchet 164, which is fixedly mounted on the adding wheel. Then when lever 160 is restored to its normal latched position by bail 166 it will move adding wheel 168 to the next higher position, thus adding "1". The above transfer mechanism will be found in Hollerith Patent No. 974,272, issued November 1, 1910. The controlling circuits will be described in connection with the complete circuit diagram of the machine.

*Circuit diagram*

The circuit shown in Figs. 10a, 10b and 10c is modified from the circuit shown in application of Daly and Page, Serial No. 6980, filed February 5, 1925, now issued as Patent #1,762,145, dated June 10, 1930 and we will refer to only such portions of it as are necessary for an understanding of this present invention.

The diagram shows five accumulators with their correlated printing devices, and in addition shows two extra printing devices not associated with any accumulator. The extra printing banks are numbered 1 and 1, while the regular accumulators with their printers are numbered 3, 4, 5, 6 and 7. Counters 3, 4, 5, and 6 have been illustrated as each having only two counter magnets controlled from the analyzing brushes although in reality they each have eight counter magnets controlled from the analyzing brushes. They have been simplified in this manner to conserve space in the wiring diagram and to make it easier to follow the explanation of the operation of the machine in connection with the circuit diagram. Counter 7, which does not enter into the explanation of the subtracting operation, has been represented very diagrammatically but it should be understood that this counter is in reality the same as any one of the counters 3, 4, 5, or 6. The elusive "1" circuit and the total selecting circuits are also shown, detached from the counters for ease of understanding.

Before describing the various circuits in detail I shall briefly set forth the general scheme of operation of the devices for entering debit and credit items into the counters.

As a card passes the upper brushes an impulse representing the value of the item, whether debit or credit, is sent either through magnets 72 via commutator R, or through magnets 277 via commutator S, to set up the complement of the item in a translator.

If commutator R and magnets 72 are used for one card, commutator S and magnets 277 are used for the next card, alternately, regardless of whether the card is a debit or credit.

If the card is a debit card an impulse is sent through a hole in the card at the "X" position via contact 61, actuated by cam X to magnet 240. This "X" position on the card, as well known in the art, is located close to the upper edge of the card, above the normal adding field. This occurs while the card is leaving the upper brushes and results in contacts 242, 244, 246 and 248 (Figs. 10c) being reversed and held reversed while that card is passing the lower brushes.

If the card is a credit card, the following events occur while the card is passing the lower brushes—the nine-complements of its digits are thrown into the debit balance counter (No. 6) via translator R M in which they were set up while the card was passing the upper brushes; "1" is added via wire 260, lower contact 248 and elusive "1" magnet 148; the amount on the card is entered into the credit total counter (No. 3) from sockets 180, and into the credit balance counter (No. 5) from sockets 186.

When a debit card is passing the lower brushes (magnet 240 having been energized as described above), the nine-complements of the digits are thrown into the credit balance counter (No. 5) via translator S N in wh'ch they were set up while the card was passing the upper brushes; "1" is added via wire 260, upper contact 248, and magnet 148; the amount on the card is entered into the debit total counter (No. 4) from sockets 184, and into the debit balance counter (No. 6) from sockets 188.

I shall now explain the wiring and plugging in detail to obtain the particular results shown in Figs. 15 and 16. Assuming that the credit total will appear on counter marked 3 on Fig. 10b, the debit total on counter 4, the credit balance on counter 5, and the debit balance on counter 6:—Sockets 170 connected to upper contact blocks 116 are plugged to sockets 172 representing the set up magnets 72 of the translating units. Sockets 174, connected to lower contact blocks 60, are plugged to sockets 176 which represent contacts 242 and 244, the determining factor as to the counters in wh'ch a true number will be added directly from the brushes. Sockets 180 are plugged to sockets 182 of counter No. 3, sockets 184 are plugged to sockets 182 of counter No. 4, sockets 186 are plugged to sockets 182 of counter No. 5, and sockets 188 are plugged to sockets 182 of counter No. 6. Socket 190 is plugged to socket 192 of counter No. 5, and socket 194 is plugged to socket 192 of counter No. 6. Plugs plugged to socket 192 of counter No. 6. Plugs 196 and 198 are inserted one in each of the sockets 200 of counters Nos. 5 and 6. Magnets 148 are really built into the several counters as shown in Fig. 7, but for clarity of description they are shown separate at the bottom of diagram Fig. 10b.

Plug socket 177 is plugged with plug 181 to the socket 179 of counter No. 5, and socket 206 is connected by plug 207 to the socket 208 of the same counter. In each other counter except No. 5 socket 179 is plugged to socket 210 and socket 208 is plugged to the socket 212 to preserve the counter circuits intact in their original form, as used in regular machines. Socket 216 is plugged to socket 218 of counter No. 5, and socket 214 is plugged to socket 218 of counter No. 6. In all other counters except the balancing counters sockets 218 are plugged to sockets 220 to preserve the total printing circuits of those counters intact.

If the fact be known in advance that the balance will be either red or black, the plugging to one of the counters 5 or 6 may be eliminated entirely as well as the use of contacts 222 to 224 hereinafter explained, and the single balancing counter may be plugged to straight total print as a regular accumulator.

With this plugging the general operation of the machine is as follows: A record card 110 passes the upper brushes 112, and each brush which finds a hole causes an impulse through one of the wires in cable 226 to socket 170, whereby magnet 72 is energized for the duration of the contact through the record card perforation by the current in the circuit traced as follows: T—5 cam contacts, now closed, brush block 228, upper brush 112, contact block 116, wire in cable 226, socket 170, plug wire, socket 172, magnet 72, brush commutator R, wire 230, and back to the other side of line. This action occurs whether the card is a debit or credit card.

If the card is a debit card there will be a hole punched in the "X" position of any convenient column on the card and as this card is passing the upper brushes after having made the set-up on magnets 72 a circuit will be closed through upper brush 112, wire cable 226, sockets 170, plug wire to socket 232 (Fig. 10b), contacts 61, momentarily closed by cam X, coils 234 of relay contacts 236, and wire 238 to other side of line. This energizes switching magnet 240 (Figs. 10b and 10c), shifting the contacts 242, 244, 246 and 248 to the reverse of the position shown in Fig. 10c. The energization of coils 234 of relay 236 establishes a stick circuit from left side of line through contacts 63 which are closed by cam Y and remain closed until the end of the adding part of the next machine cycle.

If, however, the card passing the upper brushes has no hole punched in the "X" control position, it is a credit card and magnets 234 and 240 will remain deenergized throughout the next succeeding cycle, and contacts 242, 244, 246 and 248 will remain in the position shown in Fig. 10c.

For a credit card the selection and set-up of magnets 72 is made as the card is passing the upper brushes. Then as the card travels down and is passing through the lower brushes the nine-complements are thrown into debit balance counter No. 6 by a circuit traced from right side of line through wire 250 through M commutator which is, as above shown, closed on the cycle after set-up through R commutator, through translator mechanism (Fig. 9) denoted R M on the diagram to distinguish between cycles, through wire 252, through contacts 246 (lower), sockets 188, plug wire, sockets 182 of counter No. 6, counter magnet 254, contacts 256 and wire 258 to left side of line, thus adding the complements of the credit card into debit balance counter No. 6. Inasmuch as contacts 248, also operated by magnet 240 remain in the position shown on Fig. 10c, due to the fact that magnet 240 has not been energized, current is supplied to magnet 148 of counter No. 6 to add "1" to the right hand wheel of this counter as follows: from the right side of line through wire 260, contacts 248 lower, wire 262, socket 194, plug wire, socket 192 of counter No. 6, magnet 148, plug wire 196, contacts 64, closed for a short time during the adding cycle by cam Z, wire 264 to left side of line. At the same time that this action is taking place the true amount from the card is being read from the lower brushes 114 through wires in cable 268, sockets 174, plug wires, sockets 176, wires 270 and 272, through contacts 242 (lower), and 244 (lower), respectively, to add the amount as shown on the record card perforations into credit total counter No. 3 from sockets 180 and into counter No. 5 from sockets 186. No current is supplied through sockets 184 to counter No. 4, accumulator for debits only, as contacts 242 remain in the position shown on Fig. 10c for credit card.

Suppose that directly following the credit card in the feed rolls 274 is a debit card with a hole punched in the "X" position, identifying it as a debit card. As the aforementioned credit card is passing the lower brushes the set-up for the debit card is being made through the upper brushes into magnets 277 (which were idle during the previous cycle). During this cycle, the brushes on R commutator are insulated but those on S commutator are making contact to feed the current to magnets 277.

Tracing now the machine operation for a debit card, the set-up of magnets 277 having been made as the card was passing the upper brushes, and switching magnet 240 having been energized when contact was made through the "X" hole in the debits or credits indicating-position, contacts 242, 244, 246 and 248 are shifted to a position the reverse of that shown in Fig. 10c and the card then passes through the lower brushes. At this time also brushes on N commutator make contact and those on M commutator become insulated.

As the debit card passes the lower brushes the nine-complements are thrown into counter 5, the credit balance counter, by a circuit traced from right side of line through wire 280, through N commutator which has closed its circuits, through wire 282 a translator mechanism denoted S N on the diagram, through wire 282, contacts 246 upper, sockets 186, plug wire, sockets 182 of No. 5 counter magnets 254, contacts 256 and wire 258 to left side of line, thus adding the complement of the debit card into the net credit balance counter.

Inasmuch as contacts 248 have been shifted to a position the reverse of that shown in Fig. 10c due to the fact that magnet 240 has been energized, current is supplied to magnet 148 of counter No. 5 in the following manner, to add "1" to the right hand wheel of that counter: from right side of line, through wire 260, contacts 248 upper, wire 290, socket 190, plug wire, socket 192 of counter 5, magnet 148, plug wire 198, contacts 64 closed for a short time during the adding cycle by cam Z, wire 264 to left side of line.

At the same time that this action is taking place the amount from the debit card is being read from the lower brushes 114 through wires 268, sockets 174, plug wires, sockets 176, wires 270 and 272, through contacts 242 upper and 244 upper, respectively, to add the amount as shown on the record card perforations in counter No. 4 from sockets 184 and also into counter No. 6 from sockets 188. No current is supplied through sockets 180 to counter No. 3, accumulator for credits only, as contacts 242 (lower) have been opened for the debt card.

It is not to be taken from the above, however, that commutators R and M will invariably control the throwing in of complements of credit amounts or that commutators S and N will invariably control the throwing in of complements of debit amounts, as they merely alternate the current feed to the translating unit, so that during one cycle when magnets 72 are being set up the translator mechanism R M associated with them is cut out of circuit, the translator mechanism S N is cut into circuit and the magnets 277 associated with S N cut out of circuit. On the next succeeding cycle this condition is entirely reversed, whether the succeeding card is a debit or credit.

A succession of the foregoing operations having been performed, and a series of record cards indiscriminately mixed as regards debits or credits having been run through the machine, a record sheet showing totals of credits, totals of debits, and net credit or debit balance, will be printed substantially as in Fig. 16. The start of the printing operation may be induced either manually or automatically following a change in group control number, as is well known in the art.

Totals of debits and credits are printed just as totals are usually printed in tabulating machines.

In connection with this invention, counters having any desired number of register wheels may be used. The counters disclosed herein happen to have nine wheels. The balance counters are not used for balances that run over seven columns, because the eighth column is used to indicate whether the balance be positive or negative when a total is to be printed. In the balance counters, assuming that the subtracting capacity of the machine has not been exceeded the eighth column will always show a "9" if the number is a complement or a "0" if the number is a true balance.

On the accumulating counters the ninth wheel receives the spill over from the eighth wheel whenever the eighth wheel goes over "10". On the balance counters the ninth wheel total is never printed as the switch 340 is opened manually by the operator prior to a subtracting run on each balancing counter.

Eight of the wheels will always be used when a complement stands on a balance counter, and furthermore the eighth wheel of that counter will show a "9" when a complement is indicated provided the subtracting capacity of the machine has not been exceeded. Likewise a "0" will always stand on the eighth wheel of the counter showing the true balance. Either the "0" in the eighth column of the true balance counter, or the "9" in the eighth column of the complementary counter may be used to control the printing of the true balance and the suppression of the complement. I have chosen to use the "9" in the eighth column of the counter showing the complement to cause the printing of the true balance and the suppression of the complement, as follows: As the total printing operation commences, cam contacts P—5 (Fig. 10b) close momentarily between the start of the cycle and the time when the impulse is normally received to print a "9" from any position on the counter. If, before the normal printing time, the extra high cam 134 closes contacts 140 in the eighth column of a net balance counter, it is an indication that a "9" appears in the eighth column of that counter and that the amount in that counter is a complement and not a true (black or red) number. In such case, a circuit is closed as follows: from left side of line through wire 316, contacts P—5, socket 206, plug wire 207, socket 208 of column 8 of counter No. 5, contact 140, socket 179, plug 181, socket 177, through total selecting magnet 306 which opens contacts 224 and closes contacts 222. Current also flows through relay magnet 310 which closes contacts 312, thence through accompanying resistances and wire 308 to right side of line. The closing of contacts P—6 at this time establishes a stick circuit to hold magnet 306 energized until P—6 opens at the end of the cycle.

Providing that a "9" has appeared as above in the eighth column of the credit balance counter (No. 5), denoting that the No. 5 counter contains a complement and therefore the debit balance counter (No. 6) contains the positive balance, the total is printed from No. 6 by a circuit traced as follows: from left side of line through wire 320, through contacts 222, wire 322, socket 214, plug wire, socket 218 of counter No. 6, zero button contacts 324, common bar 330a socket 212, plug wire, socket 208, contacts 140, socket 179, plug wire, socket 210, printing magnet 328, bar 330, wire 332, contacts NL—4, contacts LP—4, wire 334, contacts P—2 (lower) now closed, switch 336 and to right side of line. Counter No. 5 is reset to zero, but the printing of the complement therefrom is suppressed, due to the fact that the current feed to printing magnets of that counter was interrupted by the opening of contacts 224 when magnet 306 was energized.

If, however, at the beginning of the total-taking operation the contacts 140 in the eighth column of the balance counter (No. 6) close while can contacts P—5 are closed it is an indication that No. 6 counter contains a complement and that the net credit counter (No. 5) contains the true number which is to be printed. Magnet 306 will not become energized, contacts 224 will remain closed, contacts 222 remain open as in Fig. 10b, and current will flow to the printing magnets of the credit balance counter (No. 5) from left side of line, wire 320, contacts 224, wire 264, sockets 216, plug wire, socket 218, contacts 324, common bar 330a, contacts 140, magnet 328, bar 330, wire 332, contacts NL—3, now closed, contacts LP—3, wire 334, lower contacts P—2, now closed and switch 336, to right side of line.

The printing of the total from the debit balance counter, which is of course a complement, is suppressed by the contacts 222 which remain open.

In the event that the total of the debit items has equaled the total of the credit items, the balance counters will of course show zeros in all adding wheels. Under such circumstances no totals will be printed from the balance counters and the total printed in the debit total column will equal the total printed in the credit column. The usual total-indicating asterisk will be printed by counter No. 5.

Throughout this specification for the sake of simplicity of explanation, it has been assumed that all numbers are in the decimal system. I wish now to call attention to the fact that the present invention operates equally well with other systems of numbers as with those in the decimal system. The complements of numbers in any system may be obtained by the machine in exactly the same manner as has been explained.

For instance it may be desired to find the complement of £32 4s. 5d. There are twenty shillings in a pound and twelve pence in a shilling. This means that the pence "order" does not carry over to the shilling "order" until twelve pence have been accumulated, and the shilling "order" does not carry over to the pounds "order" until twenty shillings have been accumulated. The number representing pounds is on the decimal system, that is, each "order" represents ten units.

With the above in mind the complement of £32 4s. 5d. is obtained as already described, by subtracting the number representing each "order" from a number which is one less than the value of that order, and then adding the "elusive one" to the extreme right hand order. Thus, beginning at the left and assuming that the pounds counter has four register elements, "0", "0", "3" and "2" are each subtracted from "9", giving £9967; 4 is subtracted from 19 (20 less 1) giving 15s.; 5 is subtracted from 11 (12 less 1) giving 6d. and finally the elusive one is added to the extreme right hand order giving 7d. This operation gives the correct complement which is £9967 15s. 7d.

Inasmuch as the printing of the net balance automatically by the operation of the machine under a change of control numbers forms a part of the present invention the automatic control and total initiating circuit will be briefly described. For automatic controlling, selected sockets 170 are plugged to sockets 350 of the automatic control unit generally designated 360 (Fig. 10c). Sockets 362 of this unit are in turn plugged to the selected lower brush socket 174. The unused columns of the control unit are plugged in the usual way by inserting plug 364 in the proper socket 366. As usual, as long as cards agree, the automatic control unit 360 maintains closed the auto control circuit 368 at the time cam contacts C—1 open. Upon a disagreement of cards, circuit 368 is open at the time C—1 opens and the tabulator is automatically stopped. As the tabulator approaches its home or so-called "D" position cam contacts L—1 close and with switch 370 previously closed the circuit to the rest motor RMOT will be closed and will automatically initiate a printing and reset cycle. In this way the machine will automatically print the net balance upon a change of group or control number. The total of debits and total of credits will be printed at the same time.

It will be understood that the translators may be used conjointly with the control and classification hole devices, the translators inverting or rearranging the control numbers which can be added or subtracted if desired. For example, control may be effected by numbers representing the number of units in a lot, each lot being represented by a card. When a card representing a lot containing a different number of units from that on the preceding card passes through the machine, a total or balance might be desired. In such a case, the same number may act as a control number and a number which is to be added or subtracted.

Each upper contact block 116 may be plugged via socket 170 to (1) a socket 350 of the automatic control unit, (2) to translator magnets 72 and 277, and (3) to switching magnet socket 232. If thus connected, the upper brush corresponding to that particular block 116 (1) "controls" on the digit punched in that corresponding card column, (2) causes the translator to set up the complement of that digit, and then later in the cycle the same brush (3) operates the switching magnet provided the proper hole is punched in the record card.

The present invention is adapted for such a great variety of uses that it is impossible herein to enumerate them. However, one or two examples will be given to indicate uses and possibilities somewhat different from those already given, all of which have had reference to financial transactions. For instance, it may be desired to compile a record of freight tonnage into or out of a harbor, or east and west, or north and south, from a certain freight station. Such a tabulation might appear as follows:

Table A

| Gross | Eastbound | Westbound | Excess east over west | Excess west over east |
|---|---|---|---|---|
| 15 | 15 | | | |
| 6 | | 6 | | |
| 104 | 104 | | | |
| 22 | 22 | | | |
| 71 | | 71 | | |
| 218* (Counter 7) | 141* (Counter 3) | 77* (Counter 4) | 64* (Counter 5) | (Counter 6) |

In this tabulation it will be readily understood that the figures shown by counters No. 3, 4, 5 and 6 correspond to the credits, debits, credit balance and debit balance in Figs. 14, 15 and 16. However, in this case we have in counter No. 7, heretofore unused, a gross total of eastbound and westbound freight, or in other words, a gross total of all items passing through the machine, regardless of whether they are debits or credits. To accomplish this result, sockets 182 of counter No. 7 (not shown in drawings) are plugged to sockets 380 (Fig. 10c). Such plugging means that items passing through sockets 180 into a counter No. 3 and items passing through sockets 184 into counter No. 4 will all be entered into counter No. 7.

A somewhat simpler tabulation of the same statistics may be made as follows:

Table B

| Gross | Eastbound | Excess gross over east | Excess gross over west |
|---|---|---|---|
| 15 | 15 | | |
| 6 | | | |
| 104 | 104 | | |
| 22 | 22 | | |
| 71 | | | |
| 218* (Counter 7) | 141* (Counter 3) | 77* (Counter 5) | (Counter 6) |

Briefly, it may be stated that, among other uses, the present invention (a) classifies items (b) lists items (c) adds items (d) shows differences between totals of classes of items (e) shows the difference between the gross total of a single class (f) shows the gross total of the classes, the total of each class, and the difference between the class totals.

It is to be understood that the invention is not limited to the apparatus herein specifically illustrated and described but may be embodied in other forms without departure from its spirit.

I claim—

1. An accounting device arranged for addition and subtraction and comprising in combination, a pair of accumulators, means for entering direct numbers into one accumulator for addition thereby to obtain a true number total of said direct numbers in said accumulator, and means coacting with the aforesaid direct number entering means for entering the complements of said direct numbers into the other accumulator for addition thereby to obtain therein by the process of addition a complement of the total standing upon the first mentioned accumulator.

2. An accounting device according to claim 1 with means for reading said true number out of the accumulator which has a true number total standing thereon, and means for suppressing the reading out operation of the other accumulator.

3. An accounting apparatus comprising two accumulators operable conjointly to handle positive and negative amounts, in combination with means for entering in the first accumulator all true positive amounts and means coacting with the aforesaid entering means for entering the complements thereof into the second accumulator, means for entering in the second accumulator all true negative amounts and means coacting with said last mentioned means for entering the complements thereof into the first accumulator, means for sensing both accumulators, manifesting means controlled by the accumulators according to data thereon, means for preventing control of the manifesting means by that accumulator which shows a complementary total and effecting control of the manifesting device to manifest the true balance whether positive or negative as a true number from the other accumulator.

4. An accounting apparatus comprising two accumulators operable conjointly to handle positive and negative amounts, in combination with means for entering in the first accumulator all true positive amounts and means coacting with the aforesaid means for entering the complements thereof into the second accumulator, means for entering in the second accumulator all true negative amounts and means coacting with said last mentioned means for entering the complements thereof into the first accumulator, means for sensing both accumulators, means for determining selectively which accumulator shows a true number balance, and means for manifesting the balance from said accumulator only.

5. An accounting apparatus for obtaining a balance of debits and credits, comprising in combination, a pair of accumulators; means for entering into one accumulator the debit items, the 9-complements of the credit items and an elusive one for each 9-complement which is entered; means for entering into the other accumulator the true credit items, the 9-complements of the debit items and an elusive one for each 9-complement entered; means for sensing both accumulators to determine which of the said accumulators shows a complementary number, and means controlled by said sensing means for reading out the true balance from the other accumulator.

6. An accounting apparatus for obtaining a balance of debits and credits comprising in combination, a pair of accumulators; means for entering into one accumulator the debit items, the 9-complements of the credit items and an elusive one for each 9-complement which is entered; means for entering into the other accumulator the true credit items, the 9-complements of the debit items and an elusive one for each 9-complement entered; means for sensing the accumulators to determine which shows the true number, and means controlled by said sensing means for the disclosing of said true number.

7. In an accounting machine, in combination, dual sets of numeral wheels upon either of which sets a true total or the complement of a true total may be set up, printing mechanism for printing the said true total, and means for selectively controlling the operation of the printing mechanism according to which set of wheels shows the true total to print the total from this set of wheels only.

8. In an accounting machine, in combination, totalizing apparatus for obtaining true positive and negative totals and including an accumulating device operable in the same direction both for entering positive items by direct addition and for entering negative items by complementary addition, printing mechanism coordinated with said totalizing apparatus for printing true totals, and a control device for causing operation of said printing mechanism under control of the totalizing apparatus to print either a true positive or a true negative total.

9. An accounting device with an accumulator and means for entering true numbers and complements thereinto, to be added thereby in combination with means for reading out of the accumulator the quantity standing thereon, and means for controlling the aforesaid means so that it is effective for reading out an amount only in the event that a true number stands upon the accumulator.

10. In a machine of the character described, in combination, registering mechanism capable of adding or subtracting individual items, means associated therewith for directly entering positive items and for additively entering the complements of items which are to be subtracted, means coordinated with said registering mechanism to list the items, printing devices, and totalizing mechanism for controlling said printing devices to print either a positive or a negative balance of said items.

11. In a machine of the class described, the combination with registering mechanism capable of adding and subtracting, said registering mechanism including dual accumulating means one of which receives positive numbers and complements of negative numbers and the other of which receives negative numbers and the complements of positive numbers, and printing devices; of totaling mechanism for producing either a positive or negative total, and means for automatically determining the adjustment of the printing devices under the control of the totaling mechanism according to whether the total is positive or negative.

12 In a record controlled accounting apparatus, in combination, means for analyzing the records, means under the control of the said analyzing means for adding promiscuous positive and negative amounts derived from the records by said analyzing means, printing means and means controlled by said adding means for printing by the printing means the net total of such addition, whether the total is positive or negative.

13. In a record controlled accounting apparatus, in combination, means for analyzing the records, means comprising two accumulators for adding promiscuous positive and negative amounts derived from the records by said analyzing means, one of said accumulators showing a true total when the balance is positive, the other of said accumulators showing a true total when the balances negative, and printing means under control of said adding means for printing whichever of said totals is a true number.

14. In a record controlled accounting apparatus, in combination, means for analyzing promiscuously arranged records bearing positive and negative amounts, an accumulator in which all positive amounts and complements of all negative amounts are added, an accumulator in which all negative amounts and complements of all positive amounts are added, and means under control of said accumulators for printing the true total from whichever of said accumulators bears a true amount and suppressing the printing of the other of said totals.

15. In a record controlled accounting apparatus, in combination, means for analyzing promiscuously arranged records bearing positive and negative amounts, means for translating each of said amounts into its complement; accumulators into which said amounts and their complements are selectively entered under control of the machine to show on one of said accumulators the true balance of said amounts, and means under control of said accumulators to print only said true balance from said accumulator.

16. In a record controlled accounting apparatus, in combination, means for analyzing promiscuously arranged records bearing positive and negative amounts, a plurality of accumulators, distributing devices; and means controlled by said distributing devices whereby one of said accumulators shows the total of all positive amounts, the second of said accumulators shows the total of all negative amounts, the third of said accumulators shows the net balance if the balance is positive or the complement of the net balance if the balance is negative, and the fourth of said accumulators shows the net balance if the balance is negative or the complement of the net balance if the balance is positive.

17. The invention set forth in claim 16 in which means is provided for separately listing all positive and negative amounts.

18. The invention set forth in claim 16 in which means is provided for printing the totals from the first and second of said accumulators, and for printing the net balance from whichever one of the other accumulators shows a true number.

19. In an accounting machine, in combination, an accumulator, means for adding into said accumulator true amounts and complementary amounts, and devices operable automatically under control of the machine for sensing said accumulator to determine whether the total standing thereon is a true number or a complement.

20. In a machine of the character described, in combination with a plurality of accumulator elements, means for adding on said elements true amounts and complementary amounts, devices operable automatically for sensing a particular one of said elements to determine whether the total standing on the elements is a true or complementary number, and means under control of said sensing devices for printing said total only if it be a true number.

21. In an apparatus for converting true numbers into their complements, in combination, translating devices for subtracting each of the digits of the true number from nine to obtain the 9-complements of its digits, and means brought into action automatically upon each subtracting operation of the aforesaid translating devices for automatically adding "1" to the extreme right hand digit obtained by said translating devices.

23. In a record controlled accounting machine for handling two classes of amounts derived from the records, in combination, an accumulator, a translator, an analyzing device for transmitting true numbers from the records to said translator by which they are converted into complements of such true numbers, and automatic means for adding in said accumulator the true amounts under one of said classes of amounts plus the complements of the true amounts under the other of said classes of amounts.

23. In a record controlled accounting machine for handling two classes of amounts derived from the records, in combination, an accumulator, a translator, a first analyzer device for transmitting true numbers from the records to said translator by which the true numbers are converted into the complements thereof, a second analyzing device, and means operable for adding in said accumulator the true amounts derived by said second analyzing device from the first of said classes of amounts, plus the complements of the true amounts derived by said translator from the second of said classes of amounts.

24. The invention set forth in claim 23 in which a second accumulator is provided, and automatic devices under control of the record whereby in said second accumulator are added the true amounts derived by said second analyzing device from the second of said classes of amounts plus the complements of the true amounts derived by said translator from the first of said classes of amounts.

25. An accounting machine including means for receiving true number entries, accumulator devices controlled thereby, and means intermediate the accumulator devices and the receiving means for selecting an accumulator into which an item is to be directly entered and means also controlled by said true number receiving means for selecting another accumulator and for entering the complement of the said item thereinto.

26. An accounting machine having dual item entering means, dual accumulating devices, means controlled by one of said entering means for entering a true number into one accumulator and means controlled by the other entering means for entering the complement of such number into the other accumulator.

27. The invention set forth in claim 26 in which means is provided for automatically and successively entering an item into the two parts of the said duel item entering means.

28. An accounting machine with accumulating devices and item entering devices for entering amounts into said accumulating devices, and automatically operable means for concurrently entering into one accumulator a true number to be added thereby and for entering the complement thereof into the other accumulator to be added thereby.

29. The invention set forth in claim 28 in which means is provided for automactically reversing the entry by the operation of the machine to enter complementary amounts for addition into the accumulator formerly receiving a true number entry, and vice versa.

30. In an accounting machine, in combination, means for adding items of different classes separately and means controlled by the aforesaid means for showing the difference between the totals of the different classes, said last mentioned means including devices automatically brought into action by the operation of the machine for showing the said difference irrespective of the positive or negative character of the totals.

31. A record controlled accounting apparatus including in combination, entry receiving devices, a plurality of accumulators adapted for cooperation with said entry receiving devices for normal adding operations, and controlling devices for operatively connecting said entry receiving devices with selected accumulators for converting said selected accumulators into balance accumulators.

32. The invention set forth in claim 31 in which a selective means is provided for reading out only true number balances from the accumulators which are selected and utilized as balance accumulators.

33. A record controlled apparatus with control means for controlling the operation of the machine upon a disagreement of the records, translating means for converting amounts derived from the records into other related quantities, and a common sensing device for the records with instrumentalities controlled thereby for controlling the operation of both of the aforesaid means.

34. A record controlled machine comprising item entering means and means for separating into classes items derived from records by the item entering means, calculating devices controlled conjointly by the item entering means and the separating means for performing subtracting operations between items of different classes and means associated with the calculating devices and controlled thereby and brought into operation automatically by the operation of the machine for showing the difference between the totals of the different classes of items irrespective of the positive or negative character of the difference.

35. A record controlled apparatus with record classifying means, translating means for converting amounts derived from the records into other related quantities, and a common sensing device for the records with instrumentalities controlled thereby for controlling the operation of both of the aforesaid means.

36. A record controlled apparatus with record classifying means, control means for controlling the operation of the machine upon a disagreement of the records, translating means for converting amounts derived from the records into other related quantities, and a common sensing device for the records with instrumentalities controlled thereby for controlling the operation of all of the aforesaid means.

37. An accounting machine including data entering means and entry receiving means in combination with translating mechanism comprising reading-in means for receiving successive data entries from said data entering means and reading-out means controlled by said reading-in means for translating the successively received data and entering them into the entry receiving means, said reading out means having provisions for receiving one reading while a previously received reading is being emitted and said reading-in and reading-out means having a portion of their operating cycles in common to permit a reading-in operation on one concurrently with a reading-out operation by the other.

38. An accounting machine including data entering means and entry receiving means in combination with translating mechanism comprising reading-in means for receiving successive data entries from said data entering means and reading-out means controlled by said reading-in means for translating the successively received data and entering them into the entry receiving means, said reading-out means including mechanism for reading-out a data entry in translated form while the reading-in means is receiving a subsequent data entry.

39. A cyclically operable accounting machine including data entering means and entry receiving means in combination with translating mechanism comprising reading-in means for receiving data entries from the entering means during successive machine cycles and reading-out means controlled by the reading-in means for translating the received data and entering them into the entry receiving means during subsequent machine cycles.

40. An accounting machine including data entering means and entry receiving means in combination with translating mechanism comprising reading-in means for receiving data entries from said data entering means and reading-out means including a plurality of reading-out devices controlled by said reading-in means and operative in predetermined sequence to translate the received data and enter them into the entry receiving means.

41. A cyclically operable record controlled accounting machine including analyzing means for searching controlling records for data designations and translating mechanism controlled thereby in accordance with record analysis during one machine cycle to manifest the data in translated form during a subsequent machine cycle.

42. A cyclically operable record controlled accounting machine including analyzing means for searching controlling records for data designations in successive machine cycles and translating mechanism including means controlled by the analyzing means in accordance with record analyisis during each machine cycle and means controlled thereby to manifest the data in translated form during a following machine cycle concurrently with record analysis and control of the translating mechanism by the analyzing means during that cycle.

43. A cyclically operable record controlled accounting machine including analyzing means for searching controlling records for data designations in successive machine cycles, entry receiving devices and translating mechanism controlled by the analyzing means in accordance with record analysis during one machine cycle to enter the data in translated form into certain of said entry receiving devices during the following machine cycle, certain others of said entry receiving devices being controlled directly from the analyzing means during the last named cycle to enter data therein in its untranslated form.

44. In an accounting machine for operating on records bearing index point designations, record analyzing means for searching index points on successive records, a plurality of accounting control means controlled by said analyzing means in accordance with index point designations on records, a plurality of entry receiving devices, and means for selectively associating different ones of said entry receiving devices with said controlling means for successive records.

45. An accounting apparatus for obtaining a balance of debits and credits, comprising in combination, a pair of accumulators; means for entering into one accumulator the debit items, the 9-complements of the credit items and an elusive one for each 9-complement which is entered; means for entering into the other accumulator the true credit items, the 9-complements of the debit items and an alusive one for each 9-complement entered; sensing means to determine which of the said accumulators shows a complementary number, and means controlled by said sensing means for reading out the true balance from the other accumulator.

46. An accounting apparatus for obtaining a balance of debits and credits comprising in combination, a pair of accumulators; means for entering into one accumulator the debit items, the 9-complements of the credit items and an elusive one for each 9-complement which is entered; means for entering into the other accumulator the true credit items, the 9-complements of the debit items and an elusive one for each 9-complement entered; sensing means to determine which accumulator shows the true number, and means controlled by said sensing means for the disclosing of said true number.

47. A cyclically operable machine including a pair of accumulators, record controlled means for entering in one accumulator direct numbers represented by records, and separate entering means for entering the complements of such direct numbers in the other accumulator to be added thereby.

48. A cyclically operable record controlled machine including in combination a dual set of record analyzing means coordinated with the same record field, a pair of accumulators, means under control of one set of analyzing means for entering direct numbers in one accumulator, and means under control of the other set of analyzing means for entering the complements of such direct numbers in the other accumulator to be added thereby.

49. An accounting machine with plural accumulating devices each including a set of total representing cams, entering means for alternatively making entries of positive and negative amounts in said accumulators whereby one accumulator exhibits a true total and the other a complement thereof, and means for reading off the total standing on only the set of cams exhibiting the true total and while said cams are stationary.

JAMES W. BRYCE.